United States Patent [19]

Grobben et al.

[11] Patent Number: 5,050,147
[45] Date of Patent: Sep. 17, 1991

[54] DISC CHANGER, AND ASSOCIATED PLAYER COOPERATING WITH THE DISC CHANGER

[75] Inventors: Henri M. Grobben, Hasselt; Willem J. Borgions, Louvain; Paul P. M. Mathijs, Hasselt, all of Belgium

[73] Assignee: U.S. Philips Corporation, New York, N.Y.

[21] Appl. No.: 333,056

[22] Filed: Apr. 3, 1989

[30] Foreign Application Priority Data

Apr. 5, 1988 [NL] Netherlands .................. 8800859

[51] Int. Cl.⁵ .................. G11B 5/48; G11B 7/08
[52] U.S. Cl. .................. 369/34; 369/38; 369/194; 369/258
[58] Field of Search .................. 369/34, 36, 37, 38, 369/39, 43, 75.1, 75.2, 77.1, 77.2, 194, 258, 270; 360/98.01, 98.04, 98.05, 98.06, 99.06, 99.07

[56] References Cited

U.S. PATENT DOCUMENTS

| | | | |
|---|---|---|---|
| 4,561,078 | 12/1985 | Nakayama | 369/38 |
| 4,598,395 | 7/1986 | Smith | 369/38 X |
| 4,679,185 | 7/1987 | Van Sluys | 369/255 |
| 4,734,814 | 3/1988 | Fujino et al. | 369/194 X |
| 4,796,244 | 1/1989 | Tsuruta et al. | 369/38 |
| 4,797,865 | 1/1989 | Imai et al. | 369/36 X |

Primary Examiner—Bentsu Ro
Attorney, Agent, or Firm—David R. Treacy

[57] ABSTRACT

A disc changer comprises a frame (1), a cassette holder (3) having a positioning surface (11) for a cassette comprising with a plurality of supports for a disc, in particular an optical disc, means (75, 87) for moving said supports out of and into the cassette, and retaining means (103, 117) for retaining a disc which has been moved out of the cassette. The disc changer comprises a motor driven cassette lift to produce a rectilinear axial movement of the cassette holder relative to the frame in a direction transverse to the positioning surface of the cassette holder to transfer the discs in the cassette to a predetermined plane. The cassette lift comprises a lift element (21) which is rotatably connected to the cassette holder and which is coupled to drive means (41), which lift element has an axis of rotation (31) extending transversely of said positioning surface. The lift element comprises at least one inclined guide surface (23) for cooperation with at least one guide element of the frame, to realize said movement of the cassette holder when the lift element is rotated. The disc changer may form part of a disc player, in particular an optical-disc player.

22 Claims, 7 Drawing Sheets

DISC CHANGER, AND ASSOCIATED PLAYER COOPERATING WITH THE DISC CHANGER

BACKGROUND OF THE INVENTION

The invention relates to a disc changer, comprising a frame, a cassette holder having a positioning surface for a cassette comprising a plurality of supports having a supporting surface for a disc, in particular an optical disc, means for moving said supports into and out of the cassette, and retaining means for retaining a disc outside the cassette.

Such a disc changer is employed in the disc player disclosed in European Patent Application 0,217,393. This conventional disc player comprises a cassette holder which is fixedly arranged in the frame to receive a cassette suitable for one or more optical discs, in particular Compact Discs. This disc player further comprises a device for playing an optical disc, which device comprises a turntable for rotating the optical disc, and an electro-optical unit for optically scanning the disc. The turntable and the electro-optical unit are secured to a sub-frame which is movable relative to the frame. If the cassette in the cassette holder accommodates a plurality of discs this enables a disc which is situated on the turntable during use of the disc player to be replaced automatically by another optical disc. For this purpose the conventional disc changer comprises a mechanism for moving the sub-frame, enabling the turntable and the electro-optical unit to be brought into a position which is related to the position of the selected disc to be scanned.

A drawback of the prior art construction is that to place an optical disc onto the turntable a very vulnerable and essential part, namely the electro-optical unit, must be moved to a level corresponding to the level of the disc to be scanned. The continual movement of the electro-optical unit is likely to give rise to malfunctioning. Moreover, such a construction requires additional provisions for the electrical connections to the movably arranged playing device. Another drawback is that additional and hence cost-raising measures must be taken in order to guarantee well defined playing positions of the movable turntable.

SUMMARY OF THE INVENTION

It is an object of the invention to construct a disc changer of the type defined in the opening paragraph so as to provide a compact mechanical device being obtained which, in order to realize a disc player, can readily be combined with a device for inscribing and/or reading an optical disc without mechanical contact, without the necessity of using constructions which are susceptible to failure.

To this end the disc changer in accordance with the invention is characterized in that the disc changer comprises a motor-driven cassette lift for moving the cassette holder rectilinearly relative to the frame in a direction transverse to the positioning surface of the cassette holder to transfer the supports to one predetermined plane, the cassette lift comprising a lift element which is rotatably connected to the cassette holder and which is coupled to drive means, which left element has an axis of rotation extending transversely of the positioning surface of the cassette holder and comprises at least one guide surface which is inclined relative to the positioning surface of the cassette holder and at least one guide element which cooperates with the guide surface, to produce the movement of the cassette holder during a rotary movement of the lift element. The disc changer in accordance with the invention is capable of moving the cassette in the cassette holder in a vertical direction in such a way that a disc which is situated on an arbitrary support of the cassette and which is selected for scanning is transferred to the predetermined plane, a rotary movement being converted by relatively simple means into a linear movement of the cassette with the optical discsstored therein. When the disc changer is employed in a disc player which comprises a turntable having a supporting surface for an optical disc, said plane will be situated at a small distance, for example 5 mm, from the supporting surface of the turntable.

Generally, the disc changer in accordance with the invention is also characterized in that it comprises an automatic control system for transferring the supports to said predetermined plane. Preferably said control system comprises a detection unit, for example comprising a light barier, and a microprocessor.

An illustrative embodiment of the disc changer is characterized in that the guide surface forms part of the lift element and in that the guide element is secured to the frame. This enables a compact construction having a small overall height to be obtained.

Another suitable illustrative embodiment is characterized in that the rotatable lift element is drum shaped and comprises cylindrical wall portions which are equidistantly spaced along the circumference of the lift element and at least one further guide surface, the guide surfaces being stepped and extending along a helical path at the location of the wall portions and in that at least one further guide element is provided. In this way a very stable disc changer can be obtained, in which the lift element need perform only a limited rotary movement in order to provide the desired displacement. The stepped guide surfaces guarantee accurately defined axial positions of the cassette in the cassette holder and hence of the disc or discs accommodated in the cassette.

An further preferred embodiment of the disc changer in accordance with the invention is characterized in that opposite each guide surface in the proximity of the relevant plane a second guide surface of substantially the same shape is provided, between which guide surfaces an end portion of the guide element is axially retained. The presence of the end portion of the guide element in the slot formed between the guide surfaces guarantees a well-defined axial displacement of the lift element, even if the disc changer is used in a nonhorizontal, for example vertical, arrangement.

Yet another preferred illustrative embodiment is characterized in that rectilinear guide means are provided for guiding the cassette holder in said direction and at the same time inhibiting a rotary movement of said holder during rotation of the lift element. The rectilinear guide means thus ensure that the cassette holder can perform only a rectilinear movement, thereby preventing the cassette accommodated in the cassette holder from being rotated along with the lift element. A further preferred embodiment is characterized in that the cassette holder is rotatably connected to the lift element by means of a plurality of coupling projections which engage in cylindrical slots. The slots may be formed, for example, in a bottom portion of the lift element and the projections may be provided on the cassette holder and engage over the slot edges. In order to preclude a radial displacement of the lift element relative to the cassette holder, the disc changer in accordance with the invention preferably further comprises a central pin which is coupled both to the lift element and to the cassette holder.

It is to be noted that from U.S. Pat. No. 4,561,078 (herewith incorporated by reference) a disc changer is known which comprises a turntable, an optical head and a loading mechanism. The loading mechanism comprises a first box-shaped member which is rectilinearly movable in upward and downward directions relative to the turntable, and a second box-shaped member comprising a plurality of disc holders which can be slid into and out of the first member. The loading mechanism further comprises a transport mechanism for transferring the disc holders from one member to the other, and a lift mechanism having a lift compartment for the second member in order to bring this second element to a specific level. The lift compartment is connected to a motor driven take-up roller via a cord and during its movement it is guided by a plurality of mutually parallel guide rods.

The invention further relates to a disc player for inscribing and/or reading a rotating disc, in particular an optical disc, comprising a housing formed with an insertion opening for the insertion of a cassette, a scanning device comprising a turntable having a supporting surface for supporting a disc outside the cassette, and a disc pressure member. Such a disc player is disclosed in the afore-mentioned European Patent Application 0,217,393 and comprises a mechanism for moving the scanning device for the purpose of automati disc-changing.

It is an object of the invention to simplify the prior-art disc player so as to make the disc-changing process technically simpler, and thereby enable the disc player to be manufactured more cheaply. For this purpose the disc player in accordance with the invention is characterized in that the disc player comprises a disc changer arranged inside the housing, the predetermined plane to which the supports can be transferred by the disc changer in accordance with the invention extending parallel to and near the stationarily surface of the fixedly arranged turntable.

A preferred illustrative embodiment of the disc player in accordance with the invention is characterized in that the opening in the housing can be closed by a shutter which is pivotally connected to the housing which is configured to be can be coupled directly or indirectly to a command device at least in order to be opened, and which is locked directly or indirectly in an open position. In order to ensure that the shutter is opened and closed smoothly the disc player in accordance with the invention preferably comprises a damping device for damping the shutter movements in both pivotal directions, the shutter being configured to be coupled to said command device via a resilient lever.

BRIEF DESCRIPTION OF THE DRAWING

The invention will now be described in more detail, by way of example, with reference to the accompanying drawing, in which FIG. 1a and FIG. 1b each show a portion of a disc player in accordance with the invention in an exploded view.

DETAILED DESCRIPTION OF THE PREFERRED EMBODIMENT

Figure 1A:
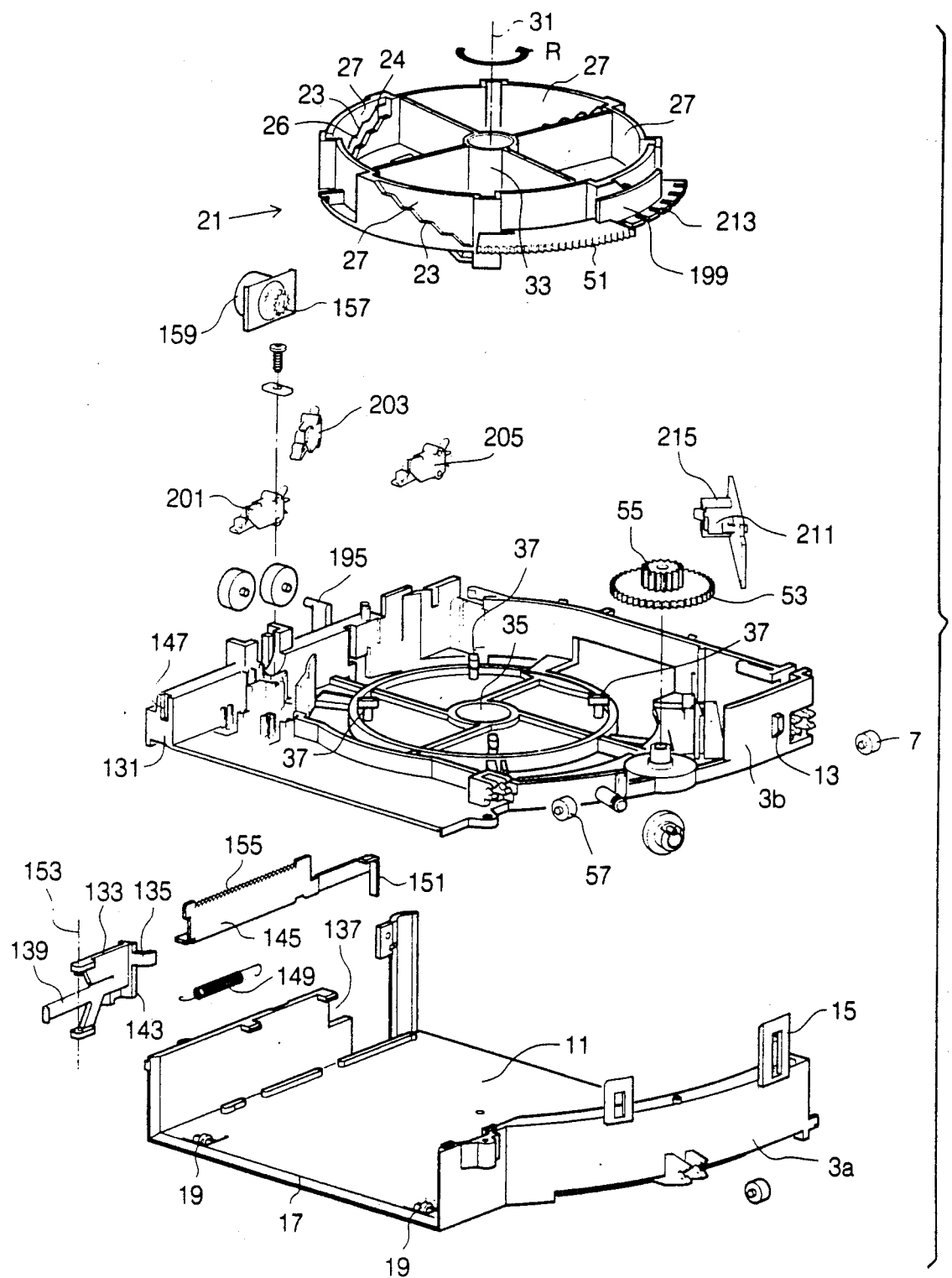

The disc player shown comprises a frame 1, a cassette holder 3 (3a, 3b) a cassette lift 5 and an electro-optical device 7 comprising a the turntable 9 having a supporting surface 9a. The cassette holder 3 has a positioning surface 11 and is constructed to receive cassettes of a type as disclosed in the afore-mentioned European Patent Application 0,217,393 and of a type as disclosed in Netherlands Patent Application, application number 8,800,360. One of these cassettes is a multi-disc cassette bearing the reference numeral 2 (see FIGS. 5, 6). The cassette 2 comprises six supports 4 which can be pivoted out of the cassette and on each of which an optical disc 6, in particular a Compact Disc, for example a CD, CDV or CD, single can be placed. The cassette holder 3 comprises two sections, a lower section 3a and an upper section 3b. The sections 3a and 3b are snapped onto each other by means of plurality of projections 13 engaging in openings 15. Rollers 19 are arranged in the bottom 17 of the cassette holder 3 to facilitate insertion and removal of a cassette from the cassette holder 3.

The cassette lift 5 comprises a lift element 21, four guide surfaces 23, and four substantially rod-shaped guide elements 25. The lift element 21 is generally cylindrical and comprises four cylindrical wall portions 27 on which guide surfaces 23 are formed. The overall orientation of the guide surfaces 23 is inclined and the individual guide surfaces oriented similarly relative to each other. The guide surfaces 23 each have six horizontal, i.e. non-inclined, faces 23a which serve to define six axial positions of the cassette holder 3. These guide elements 25 are secured to the frame 1 and have free hook-shaped end portions 29, which are adapted to cooperate with said guide surfaces 23. Second guide surfaces 24 are situated opposite the guide surfaces 23 and spaced from and together with the surfaces 23 they define slots 26 in which the end portions 29 are retained.

The lift element 21 is rotatably connected to the upper section 3b of the cassette holder 3 and has an axis of rotation 31 which extends transversely of the positioning surface 11 of the cassette holder 3. A hollow central pin 33 of the lift element 21 engages in a central opening 35 in the upper section 3b to support the lift element 21 radially relative to the cassette holder 3. The lift element 21 is supported axially relative to the cassette holder 3 by means of a plurality of projections 37, for example four, which are secured to the upper section 3b and which have thickened end portions which engage in cylindrical slots 39 in the lift element 21.

The cassette lift 5 is driven by means of an electric motor 41. The electric motor 41 is provided with a drive pulley 43 which cooperates with a V-belt 45, which also runs over a suitable pulley 47. The pulley 47 carries a comparatively high gear wheel 49, which meshes with a gear-wheel combination 53, 55 which is journalled in the cassette holder 3 and of which the gear-wheel 55 cooperates with a circularly cylindrical gear-rack segment 51 on the lift element 21. For completeness' sake it is to be noted that the parts 41, 47 and 49 are supported in the frame 1.

When the electric motor 41 is energised the lift element 21 is rotated in one direction or the other direction relative to the axis of rotation 31, depending on the direction of rotation of the drive pulley 43. Owing to the construction described in the foregoing the rotary movement of the lift element 21 is converted into a translational movement along the axis of rotation 31, both the lift element 21 and the cassette holder 3 being axially moved over a specific predetermined axial travel. In order to ensure that the last mentioned movement proceeds as smoothly as possible rectilinear guide means are provided comprising three rollers 57 which are rotatably supported in the cassette holder and which cooperate with vertical wall portions of the frame 1. It is alternatively possible to replace the rollers 57 by a single roller which is guided in a straight groove in the frame 1. The rectilinear guide means also inhibit a rotation movement of the cassette holder.

The electro-optical device 7 employed in the disc player in accordance with the invention may be of a type as described in U.S. Pat. No. 4,679,185 (herewith incorporated by reference) and can form one integrated module 59 with the turntable 9. The module 59 comprises a mounting plate 61 which is secured to the frame 1 by means of a member 63 and a plurality of bolts. The mounting plate 61 carries an electric motor 65 for driving the turntable 9 about an axis of rotation 65a. The electro-optical device 7 arranged on the mounting plate 61 comprises an objective 69 which is movable along an optical axis 67 and which forms part of a scanning unit 72 which is secured to a pivotal-arm device 71, whose light source is a semiconductor laser and which is pivotable about a pivotal axis 73. The electro-optical device further comprises optical and opto-electronic means necessary for reading and processing the optical information from an optical disc placed on the turntable. The construction and the operation of the electro-optical device will not be described in further detail because they are not of any relevance to the present invention.

The disc player in accordance with the invention comprises a command device, comprising a command shaft 75 and an electric motor 77 which can initiate or stop the various movements in the disc player. The motor 77 is fixedly supported in the frame 1 and is coupled to the command member 75 via a belt transmission 79 and a gearwheel transmission 81, a pinion 83 being in mesh with a gear rack 85.

The disc player in accordance with the invention comprises an actuating member 87 which is pivotally supported in the frame 1 and which comprises two guide pins 89 which engage in curved guide slots 91 in the frame 1 and which are movable in these slots. The actuating member 87 has a V-shaped contact face 93 for cooperation with a projection 95 of the command shaft 75. The actuating member 87 further comprises two actuating limbs, namely a first actuating limb 97, and a second actuating limb 99 for pivoting a support with an optical disc, if present, out of the cassette or into the cassette in conjunction with a cassette in the cassette holder 3.

A first retaining arm 103 is arranged inside the frame 1 and is pivotally secured to a side wall 101 of the frame 1, a pressure member 105 being spring-mounted in said arm by means of a plate spring 107. The retaining arm 103 comprises pivots 109 and has such dimensions that the pressure member 105 is situated opposite the turntable 9. In a first position of the first retaining arm 103 the pressure member 105 is spaced at some distance from the turntable 9, a roller 111, which is mounted for rotation on the arm 103, cooperating with a profiled lower surface 113 of the command shaft 75. In a second position of the retaining arm 103 this arm 103 is pivotable through a limited angle about a pivotal axis defined by the pivots 109, in order to urge an optical disc against the supporting surface 9a of the turntable. A tension spring 115 is arranged between the first arm 103 and the frame 1 to provide the desired pressure. A second arm 117 is arranged inside the frame 1 and is pivotally connected to a rear wall 119 of the frame 1. The arm 117 has pivots 121 and is pivotable to a limited extent about a pivotal axis defined by the pivots 121, a compression spring 123 being arranged between the arm 117 and the frame 1. The second arm 117 has a limb 125 for cooperation with two projecting command profiles 127 and 129 on the command shaft 75.

Figure 5:
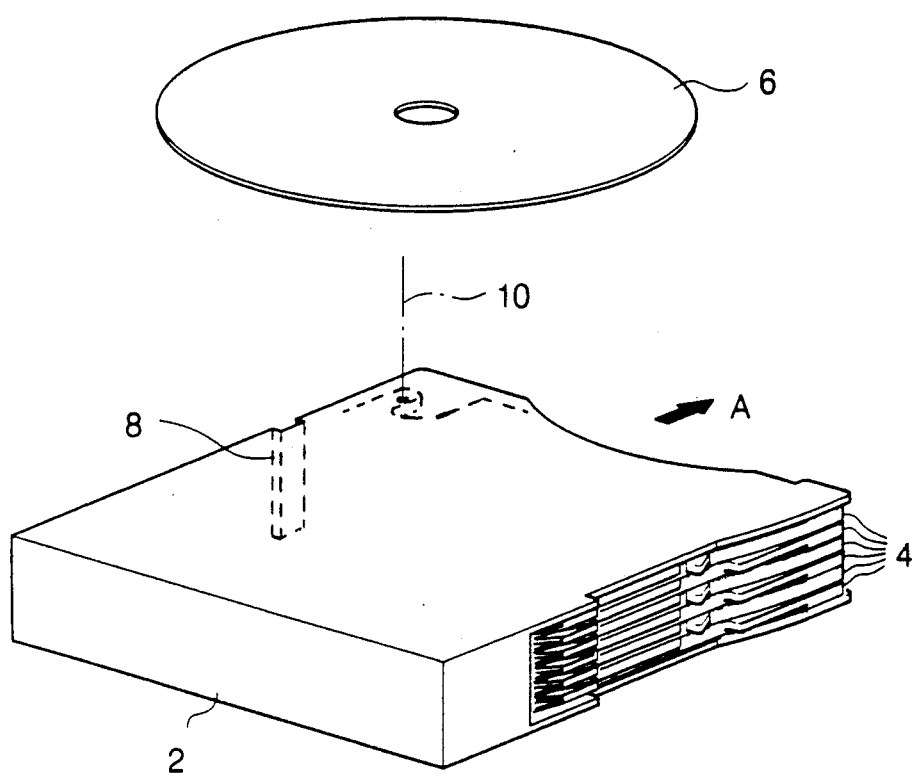
FIG. 5 shows a cassette and an optical disc, intended for use in conjunction with the disc player in accordance with the invention.

A latching member 133 is arranged on a side wall 131 of the cassette holder 3 for a limited pivotal movement about a pivotal axis 153 and comprises a latching projection 135 which is engageable in a recess in a side wall of a cassette 2 inserted in the cassette holder 3. In FIG. 5 the recess is shown diagrammatically and bears the reference numeral 8. In the latched condition the projection 134 projects through an opening 137 in the side wall 131, the latched condition being maintained by a resilient portion 139. The command shaft 75 provides the appropriate release action, for which purpose the it comprises a release pin 141 for cooperation with a surface 143 of the latching member 133.

A cassette-ejection slide 145 is arranged in the side wall 131 of the cassette holder 3 and serves to slide a cassette out of the cassette holder 3 at the appropriate instant. The slide 145 is movable in a longitudinal slot 147 in the side wall 131. A tension spring 149 is arranged between the slide 145 and the cassette holder 3 and is tensioned when a cassette is inserted. For this purpose the slide 145 comprises a stop 151 for cooperation with a cassette to be inserted in the cassette holder, the slide 145 being moved over a limited distance during the insertion movement towards the rear wall 119. When the cassette in the cassette holder is released, the spring energy thus built up causes the cassette to be ejected by means of the slide 145. In order to ensure a uniform movement the slide 145 is coupled to a damper 159 by means of a gear-rack 155 and a pinion 157.

The disc player in accordance with the invention comprises a housing 161 (FIG. 6) having a front wall 163 in which a front opening 165 is formed through which a cassette to be placed in the cassette holder 3 can be inserted. For reasons of safety and for aesthetic reasons it isadvisable to keep the front opening closed whenever possible. For this purpose the disc player in accordance with the invention comprises a shutter 167 which is pivotable about a spindle 166 and a mechanism for actuating the shutter.

The mechanism comprises a resilient first lever 171, which is pivotally connected to a member 169 of the frame 1, and a rigid second lever 173, which is pivotally connected to the frame 1 and which has a pivotal axis 175. The first lever 171 comprises a first projection 177 for cooperation with an inclined projection 179 of the command shaft 75, a second projection 181 of the lever 171 adjacent the first projection 177 being provided for cooperation with a latching projection 183 of said lever 173. The first lever 171 further comprises a first end portion 185 for cooperation with an edge portion 187 of the shutter 167, and a second end portion 189, which is coupled to a one-way or two-way damping element 191 supported in the frame. The second lever 173 has an inclined surface 193 for cooperation with a release pin 195 of the cassette holder 3.

The disc player in accordance with the invention, as shown in the Figures, comprises a plurality of switches, of which the following are important for a correct operation of the entire mechanism. A safety switch 201 (FIG. 1) is arranged in the cassette holder 3 to detect the presence of a cassette in the cassette holder, which is inter alia of importance for the actuation of the shutter 167. Two switches 203 and 205 are arranged on the outside of the cassette holder 3. The switch 203 is used for detecting the type of cassette in the cassette holder 3. This may be a cassette of a type as shown in FIG. 5, referred to as a multi-disc cassette, or a cassette of the same dimensions but adapted to receive only one optical disc, also referred to as single cassette. The switch 205 is actuated once a cassette has been inserted fully into the cassette holder 3. If required, the switch 205 may also be arranged inside the cassette holder near the front of this holder. Two switches 207 and 209 are arranged on the frame 1 near the rear wall 119 to cooperate with a raised portion 197 of the command shaft 75 in order to stop the electric motor 77. A switch 211 is arranged adjacent the lift element 21 on the cassette holder 3 to cooperate with an actuating wall 199 of the lift element 21 for detecting the top position of the cassette holder 3. In this respect it is to be noted that the cassette holder is movable between said top position and a bottom position, four other intermediate positions being possible in the present embodiment. A photocell 215 is arranged adjacent the switch 211 opposite a gear-ring 213 of the lift element 21 to detect the bottom position and the intermediate positions of the cassette holder 3.

The operation of the disc player will now be described in more detail. Before a cassette, for example the cassette 2 shown in FIG. 5, can be inserted into the cassette holder 3 the shutter 167 must be opened. For this purpose the user can start the electric motor 77 by pressing an actuating button 217 in the front wall 163 of the housing 161. The motor 77 drives the command shaft 75, causing the inclined portion 179 to abut against the first projection 177 of the resilient lever 171. As a result of a pivotal movement of the lever 171 the second projection 181 is arrested by the projection 183 of the lever 173 and the first end portion 185 of the lever 171 engages against the edge 187 of the shutter 167, so that this shutter is opened by a pivotal movement about the pivotal axis 166.

The cassette holder 3, which has already stated is vertically movable along the axis of rotation 31 between a top position and a bottom position, is in the top position when the shutter is opened. The cassette 2 must be inserted into the cassette holder 3 in the direction indicated by the arrow A in FIG. 5. Mis-insertion can be precluded by arranging for example a detection element in the cassette holder, which element corresponds to a recess in the cassette, or by arranging a detection element, for example a projection, on the cassette and a detector, for example a mechanical, electrical or optical detector, in the disc player. When the cassette is inserted the switches 201, 203 and 205 are energized consecutively. Moreover, when the cassette is inserted the cassette-ejection slide 145 is moved along to tension the spring 149. At the end of the insertion movement the cassette is latched by the latching projection 135.

The cassette 2 in the cassette holder 3 is subsequently moved to the bottom position in that the electric motor 141 is started automatically, causing the lift element 21 to perform a rotation as indicated by the arrow R in FIG. 1a and causing the cassette holder 3 to be lowered rectilinearly. During this movement of the cassette holder 3 the release pin 195 abuts against the inclined surface 193 of the lever 173, so that this lever performs a pivotal movement and the latching projection 183 releases the resilient lever 171. This enables the lever 171 to return to its rest position, causing it to be disengaged from the shutter edge 187, the shutter 167 being closed by the spring force provided by a wire spring 129 secured in the frame.

Figure 3:
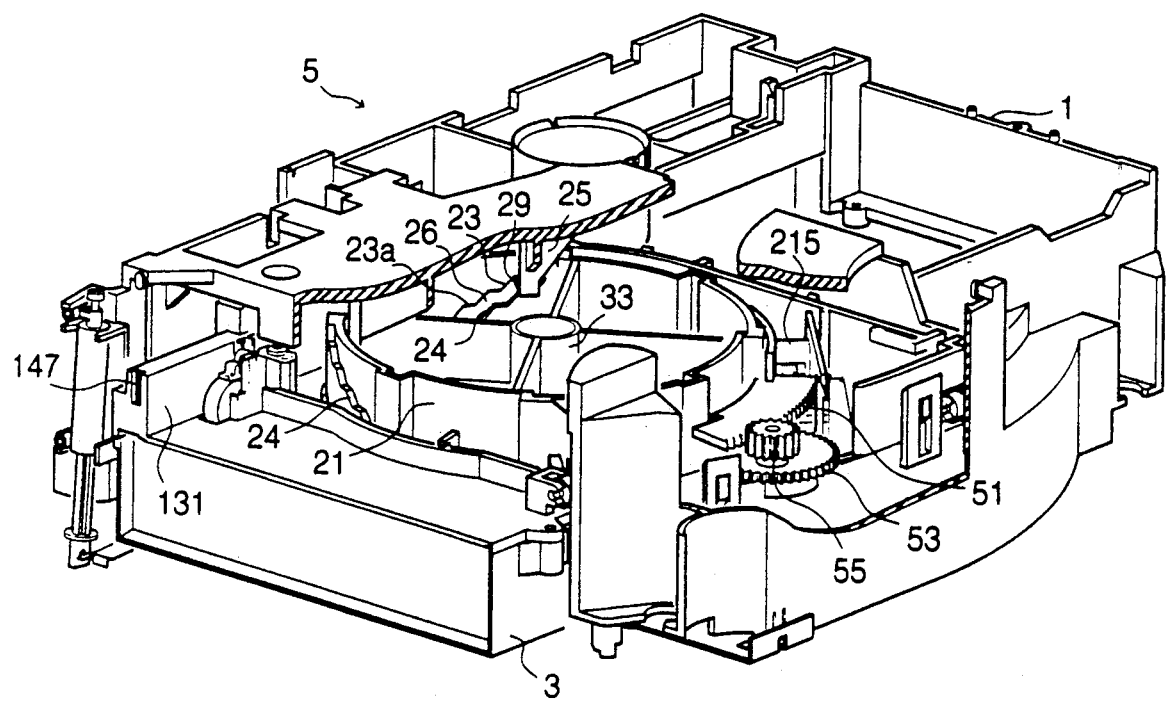
FIG. 3 is a partly sectional view of disc changer in accordance with the invention used in the disc player shown in FIG. 1, the cassette holder occupying one of the possible positions.
Figure 4:
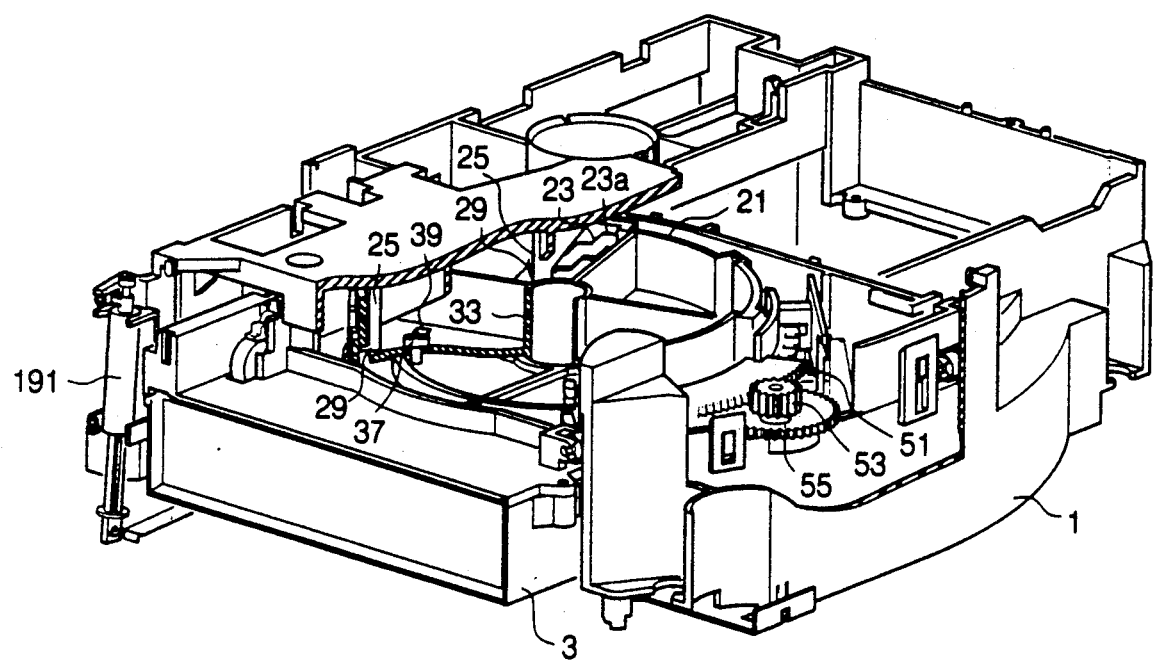
FIG. 4 shows the same disc changer as FIG. 3, the cassette holder being in another position.
Figure 6:
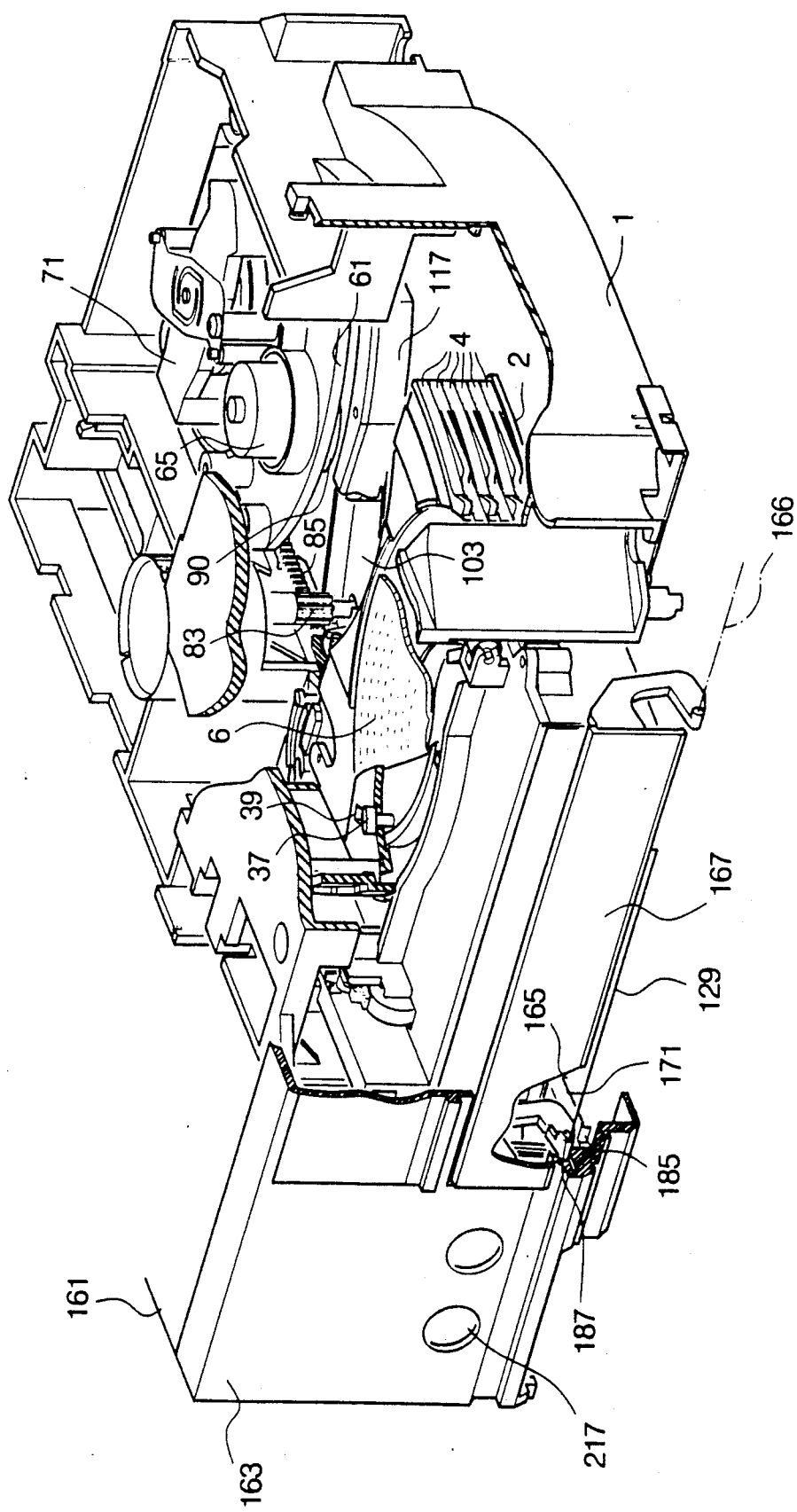
FIG. 6 shows a part of the disc player shown in FIG. 1, the cassette shown in FIG. 5 being situated in the cassette holder of the disc changer.

In the bottom position of the cassette holder, as shown in FIG. 6, a user can make a choice from the discs present in the cassette, which can be signalled to the microprocessor in the disc player via the keys in the housing 161. After this, the cassette holder 3 is moved from the bottom position, in which the disc player is in a stand-by mode, by starting the motor 41 and is subsequently moved so far upwards, by pivoting the lift element 21 through a specific angle, that the selected disc is situated exactly in a predetermined plane. In the present embodiment this plane is situated approximately 5 mm below the supporting surface 9a of the turntable 9. The disc player is then in an intermediate position as is shown for example in FIG. 3 or FIG. 4. In FIG. 3 the cassette holder 3 is situated at a comparatively low level, which means that the selected disc is situated in the upper half of the cassette; in FIG. 4 the cassette holder is situated in a higher area, which means that the selected disc is situated in the lower cassette half.

Figure 1B:
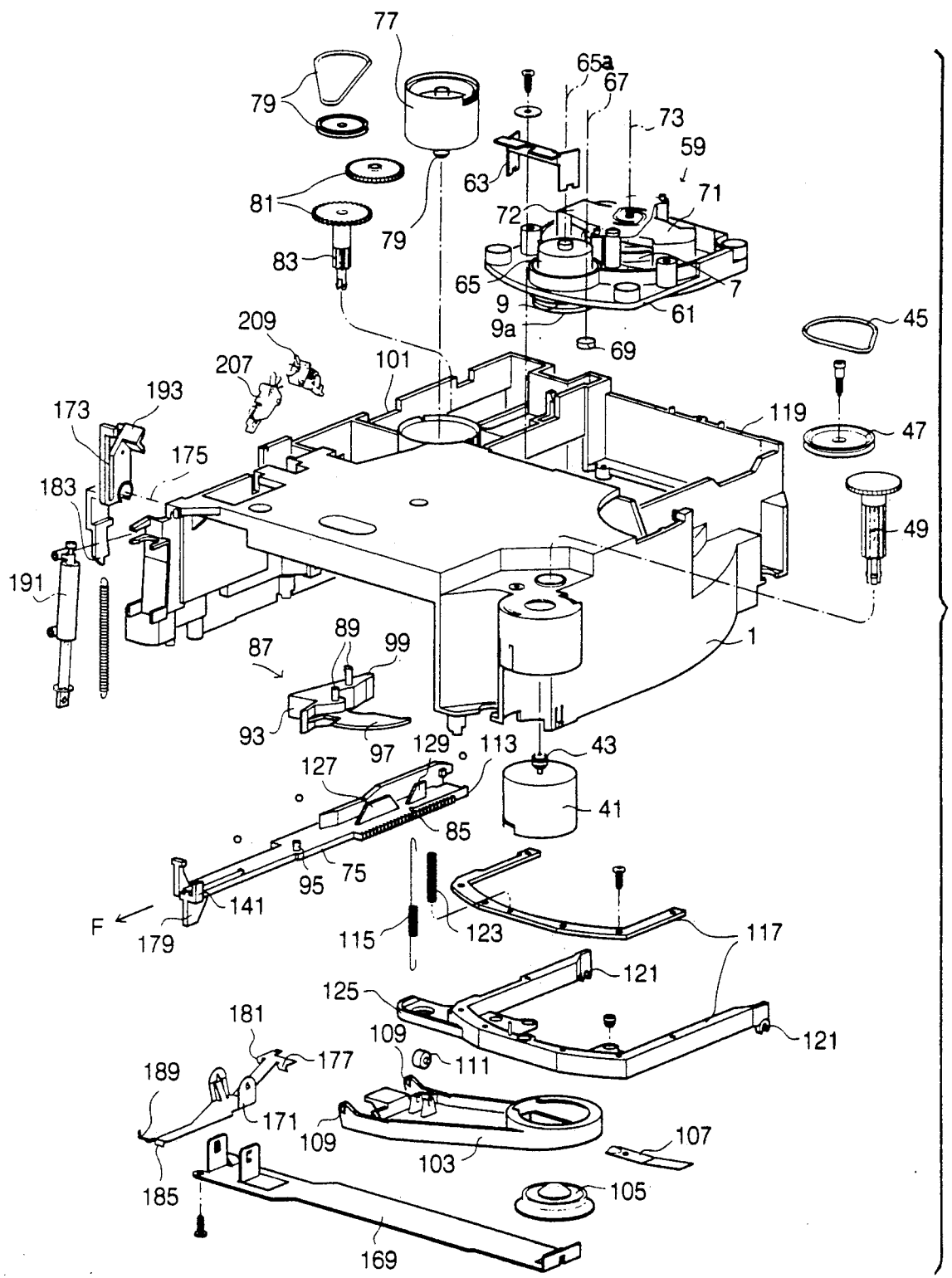
Figure 2:
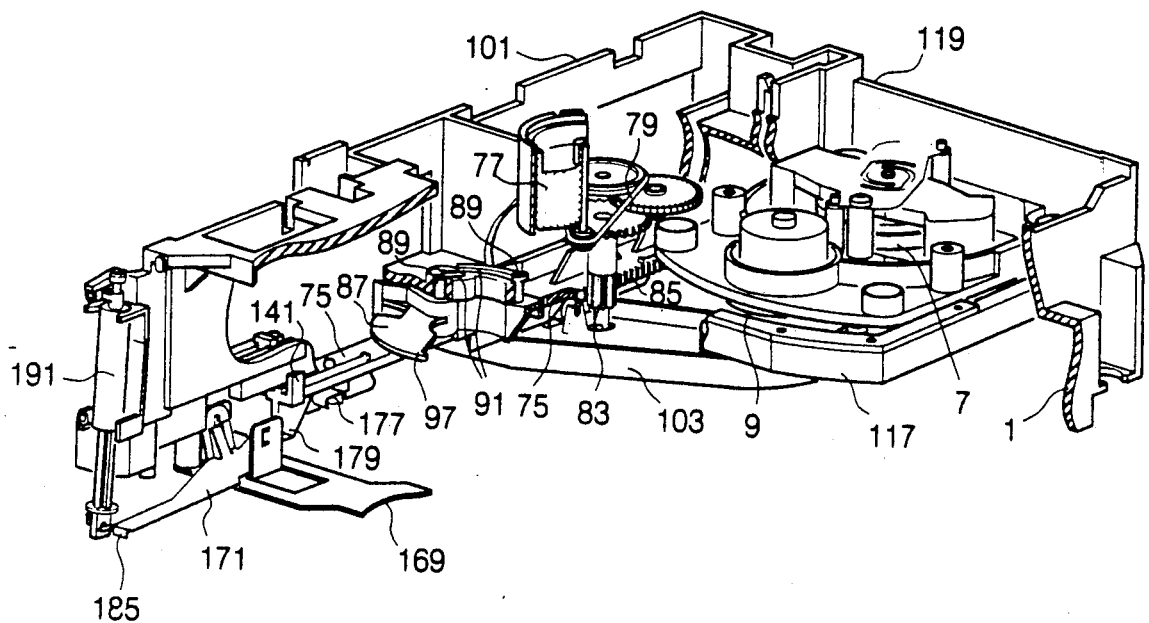
FIG. 2 shows a part of the disc player shown in FIG. 1 in a partly assembled condition.

In the intermediate position of the disc player as described above the electric motor 77 is started automatically, causing the command shaft 75 to be driven in a direction as indicated by the arrow F in FIG. 1b. The projection 95 of the command shaft 75 then engages with the contact surface 93 of the actuating member 87 in such a way that as a result of the pivotal movement of said member the actuating limb 99 moves the support 4 carrying the selected disc out of the cassette 2 by a pivotal movement about a pivotal axis 10 defined in the cassette (FIG. 5). FIG. 2 illustrates the position of the actuating member 87 in which a support 4 is swung substantially halfway out of the cassette 2. If the support is swung out fully the selected disc will be in a coaxial position underneath the turntable 9. During the forward movement of the command shaft 75 the retaining arms 103 and 117 are also actuated by the profiled lower surface 113 and by the command profiless 127 and 129 of the command shaft 75, respectively. These elements are dimensioned in such a way that the optical disc situated underneath the turntable on a swung-out support 4 is clamped between the pressure member 105 on the first arm 103 and the second arm 117 and is subsequently lifted off the support and transferred to the turntable 9. As the movement of the command shaft 75 continues the second arm 117 is returned to a position which is spaced from the disc, after which the movement of the command shaft 75 ceases, the pressure member 105 keeping the disc urged against the turntable 9. The disc player is now in the playing mode, in which the electric motor 65 is started automatically to drive the disc on the turntable 9 and the electro-optical device 7 is put into operation.

It is obvious that the invention is not limited to the illustrative embodiments disclosed in the present application, various modifications of the disc changer and disc player shown herein being possible within the scope of the invention.

We claim:

1. A disc changer, comprising:
   a frame,
   a cassette holder having a positioning surface for a cassette comprising a plurality of supports each having a supporting surface for a disc,
   means for moving said supports into and out of the cassette, and
   retaining means for retaining a disc outside the cassette, characterized in that the disc changer comprises a motor-driven cassette lift for moving the cassette holder rectilinearly relative to the frame in a direction transverse to the positioning surface of the cassette holder to transfer the supports to one predetermined plane, the cassette lift comprising a lift element which is rotatably connected to the cassette holder and which is coupled to drive means, which lift element has an axis of rotation extending transversely of the positioning surface of the cassette holder and comprises at least one guide surface which is inclined relative to the positioning surface of the cassette holder and at least one guide element which cooperates with the guide surface, to produce said movement of the cassette holder during a rotary movement of the lift element.

2. A disc changer as claimed in claim 1, characterized in that it comprises an automatic control system for transferring the supports to said plane.

3. A disc changer as claimed in claim 1 or 2, characterized in that said guide surface forms part of the lift element, and in that said guide element is secured to the frame.

4. A disc changer as claimed in claim 3, characterized in that the rotatable lift element is drum-shaped and comprises cylindrical wall portions which are equidistantly spaced along the circumference of the lift element and at least one further guide surface, the guide surfaces being stepped and extending along a helical path at the location of the wall portions, and in that at least one further guide element is provided.

5. A disc changer as claimed in claim 1, or 2, characterized in that opposite each guide surface in the proximity of the relevant plane there a second guide surface of substantially the same shape is provided, between which guide surfaces an end portion of the guide element is axially retained.

6. A disc changer as claimed in claim 1 or 2, characterized in that rectilinear guide means are provided for guiding the cassette holder in said direction and at the same time inhibiting a rotary movement of said holder during rotation of the lift element.

7. A disc changer as claimed in claim 1, characterized in that the cassette holder is rotatably connected to the lift element by means of a plurality of coupling projections which engage in cylindrical slots.

8. A disc changer as claimed in claim 1, characterized in that said drive means comprise an electric motor for driving the lift element via at least one gear wheel and teeth provided on the lift element.

9. A disc changer as claimed in any one of claims 1, 2, 7 and 8, characterized in that the means for moving the supports out of and into the cassette comprise a member which is rotatably supported in the frame and which comprises a projection which acts against a side wall portion of one of the supports to move said support out of the cassette, which member comprises a surface against another side wall portion of the relevant support to move the relevant support into the cassette acts, said member being configured to be coupled to a command device.

10. A disc changer as claimed in any one of claims 1, 2, 7 and 8, characterized in that said retaining means comprise a first and a second retaining arm which are pivotally mounted on the frame and which are configured to be coupled to a command device.

11. A disc changer as claimed in any one of the claims 1, 2, 7 and 8, characterized in that the axis of rotation of the lift element relative to the cassette holder is defined by a central pin which is coupled both to the lift element and to the cassette holder.

12. A disc changer as claimed in claim 9, characterized in that the command device comprises at least one command shaft which is adapted to be driven by an electric motor.

13. A disc changer as claimed in claim 2, characterized in that said control system comprises a detection unit and a microprocessor.

14. A disc changer as claimed in claim 13, characterized in that the detection unit comprises a light cell.

15. A disc player for inscribing and/or reading a rotating disc, comprising:
    a housing formed with an insertion opening for inserting a cassette,
    a cassette holder having a positioning surface for the cassette including a plurality of supports having a respective supporting surface for a disc,
    a scanning device comprising a turntable having a supporting surface for supporting the disc outside the cassette, and
    a disc pressure member arranged opposite the turntable,
    wherein the disc player further comprises a disc changer arranged inside the housing; and the disc changer comprises a motor-driven cassette lift for moving the cassette holder rectilinearly relative to the housing in a direction transverse to the positioning surface of the cassette holder to transfer the supports to one predetermined plane, a command device, and retaining means including a first and a second retaining arm which are pivotally mounted on a frame and are configured to be coupled to said command device, for retaining the disc outside the cassette,
    the cassette lift comprises a lift element which is rotatably connected to the cassette holder and which is coupled to drive means,
    the lift element has an axis of rotation extending transverse to the positioning surface of the cassette holder, and comprises at least one guide surface inclined relative to the positioning surface of the cassette holder and at least one guide element cooperating with the guide surface, to produce the movement of the cassette holder during a rotary movement of the lift element, said plane to which the supports can be transferred by the disc changer extending parallel to and near the supporting surface of the stationarily arranged turntable, and
    said disc pressure member is secured to said first retaining arm.

16. A disc player for inscribing and/or reading a rotating disc, comprising:
- a housing formed with an insertion opening for inserting a cassette,
- a cassette holder having a positioning surface for a cassette including a plurality of supports having a supporting surface for a disc,
- a scanning device comprising a turntable having a supporting surface for supporting a disc outside the cassette, and
- a disc pressure member,
- wherein the disc player further comprises a disc changer arranged inside the housing; and the disc changer comprises a motor-driven cassette lift for moving the cassette holder rectilinearly relative to the housing in a direction transverse to the positioning surface of the cassette holder to transfer the supports to one predetermined plane,
- the cassette lift comprises a lift element which is rotatably connected to the cassette holder and which is coupled to drive means, and
- the lift element has an axis of rotation extending transverse to the positioning surface of the cassette holder, and comprises at least one guide surface inclined relative to the positioning surface of the cassette holder and at least one guide element cooperating with the guide surface, to produce the movement of the cassette holder during a rotary movement of the lift element, said plane to which the supports can be transferred by the disc changer extending parallel to and near the supporting surface of the stationarily arranged turntable.

17. A disc player as claimed in claim 16, characterized in that said opening in the housing can be closed by means of a shutter which is pivotally connected to the housing, which is configured to be coupled directly or indirectly to a command device, at least in order to be opened, and which is locked directly or indirectly in an open position.

18. A disc player as claimed in claim 17, characterized in that it comprises a damping device for damping the shutter movement in at least one pivotal direction, the shutter being configured to be coupled to the command device via a resilient lever.

19. A disc player as claimed in claim 17 or 18, characterized in for the purpose of closing the shutter that the shutter can be unlocked by a direct or indirect coupling to the cassette holder.

20. A disc player as claimed in claim 18, characterized in that the shutter is locked in the open position by locking the resilient lever by means of a rigid lever supported in the housing.

21. A disc player as claimed in claim 20, characterized in that during a movement of the cassette holder the shutter can be released by a pivotal movement of the rigid lever caused by the cassette holder thereby, causing the resilient lever to be unlocked.

22. A disc player as claimed in claim 17, 18, 20 or 21, characterized in that the shutter is brought into and held in a closed condition by means of a spring.

* * * * *